(12) United States Patent
Yuan et al.

(10) Patent No.: US 11,007,858 B2
(45) Date of Patent: May 18, 2021

(54) POWER APPARATUS, CONTROL METHOD FOR POWER APPARATUS, AND TRAVELING DEVICE

(71) Applicant: NINE INTELLIGENT (CHANGZHOU) TECH CO., LTD., Changzhou (CN)

(72) Inventors: Zhangping Yuan, Beijing (CN); Hongbo Chen, Beijing (CN); Aiguo Chen, Beijing (CN); Yongxu Hu, Beijing (CN); Li Li, Beijing (CN); Yiwen Chen, Beijing (CN); Zhengchang Deng, Beijing (CN)

(73) Assignee: NINE INTELLIGENT (CHANGZHOU) TECH CO., LTD., Changzhou (CN)

( * ) Notice: Subject to any disclaimer, the term of this patent is extended or adjusted under 35 U.S.C. 154(b) by 0 days.

(21) Appl. No.: 16/849,698

(22) Filed: Apr. 15, 2020

(65) Prior Publication Data

US 2020/0238815 A1 Jul. 30, 2020

Related U.S. Application Data

(63) Continuation of application No. PCT/CN2019/107968, filed on Sep. 25, 2019.

(30) Foreign Application Priority Data

Oct. 9, 2018 (CN) .......................... 201811171896.4

(51) Int. Cl.
*B60K 6/36* (2007.10)
*B60K 6/547* (2007.10)
*F02N 11/08* (2006.01)

(52) U.S. Cl.
CPC ................ *B60K 6/36* (2013.01); *B60K 6/547* (2013.01); *F02N 11/0814* (2013.01)

(58) Field of Classification Search
CPC ... B60K 6/36; B60K 6/38; B60K 6/40; B60K 6/50; B60K 6/54; B60K 6/547; F02N 11/0814
(Continued)

(56) References Cited

U.S. PATENT DOCUMENTS 6,887,180 B2    5/2005 Pels
7,726,430 B2 *  6/2010 Yang ........................ B60K 6/52
                                                180/242
(Continued)

FOREIGN PATENT DOCUMENTS

CN    201777126 U    3/2011
CN    103978886 A    8/2014
(Continued)

*Primary Examiner* — John D Walters
(74) *Attorney, Agent, or Firm* — Cooper Legal Group, LLC (57) ABSTRACT

A power apparatus includes: an input shaft; an output shaft; a connecting mechanism; a first driving mechanism; a second driving mechanism of which an output end is fixedly connected with the input shaft; a first transmission component sleeved on the input shaft; a second transmission component sleeved on the output shaft; a third transmission component sleeved on the input shaft; a fourth transmission component sleeved on the output shaft; a changeover mechanism causing the first transmission component to rotate with rotation of the input shaft, the first transmission component rotating to drive the second transmission component to rotate, the output shaft rotating with the rotation of the second transmission component; or causing the third transmission component to rotate with rotation of the input shaft, the third transmission component rotating to drive the
(Continued)

fourth transmission component to rotate, the output shaft rotating with the rotation of the fourth transmission component.

20 Claims, 3 Drawing Sheets

(58) Field of Classification Search
USPC .................................................. 180/65.22
See application file for complete search history.

(56) References Cited

U.S. PATENT DOCUMENTS

| | | | |
|---|---|---|---|
| 9,656,659 B2 * | 5/2017 | Shukla | ................. B60W 30/19 |
| 9,764,631 B2 | 9/2017 | Kim | |
| 2002/0177504 A1 | 11/2002 | Pels | |
| 2015/0111694 A1 | 4/2015 | Kim | |

FOREIGN PATENT DOCUMENTS

| | | |
|---|---|---|
| CN | 205836512 U | 12/2016 |
| CN | 206678766 U | 11/2017 |
| CN | 109986947 A | 7/2019 |
| CN | 110077220 A | 8/2019 |
| CN | 209650037 U | 11/2019 |
| EP | 3546791 A1 | 10/2019 |

\* cited by examiner

POWER APPARATUS, CONTROL METHOD FOR POWER APPARATUS, AND TRAVELING DEVICE

CROSS-REFERENCE TO RELATED APPLICATIONS

The present application is a continuation of International Application No. PCT/CN2019/107968, filed on Sep. 25, 2019, which claims priority to Chinese Patent Application No. 201811171896.4, filed on Oct. 9, 2018. The disclosures of International Application No. PCT/CN2019/107968 and Chinese Patent Application No. 201811171896.4 are hereby incorporated by reference in their entireties.

TECHNICAL FIELD

The present disclosure relates to the field of power technologies, more particularly, to a power apparatus, a control method for a power apparatus, and a traveling device.

BACKGROUND

Traveling devices are a kind of commonly used travel equipment. However, in the prior art, the traveling device is generally provided with only one driving mechanism, as a result, only one driving mechanism operates during traveling, which limits the usage of the traveling device.

SUMMARY

To solve the problems existing in the prior art, the embodiments of the present disclosure provide a power apparatus, a control method for a power apparatus, and a traveling device.

The embodiments of the present disclosure are implemented as follows.

Embodiments of the present disclosure provide a power apparatus, including: an input shaft; an output shaft; a connecting mechanism; a first driving mechanism of which an output end is connected with or separated from the input shaft through the connecting mechanism; a second driving mechanism of which an output end is fixedly connected with the input shaft; a first transmission component disposed on the input shaft; a second transmission component disposed on the output shaft and fittingly connected with the first transmission component; a third transmission component disposed on the input shaft; a fourth transmission component disposed on the output shaft and fittingly connected with the third transmission component; a changeover mechanism, which causes the first transmission component to rotate with rotation of the input shaft as the input shaft rotates, the first transmission component rotating to drive the second transmission component to rotate, the output shaft rotating with the rotation of the second transmission component; or which causes the third transmission component to rotate with rotation of the input shaft, the third transmission component rotating to drive the fourth transmission component to rotate, the output shaft rotating with the rotation of the fourth transmission component.

A traveling device is also provided in the embodiments of the present disclosure, which includes a power apparatus including: an input shaft; an output shaft; a connecting mechanism; a first driving mechanism of which an output end is connected with or separated from the input shaft through the connecting mechanism; a second driving mechanism of which an output end is fixedly connected with the input shaft; a first transmission component disposed on the input shaft; a second transmission component disposed on the output shaft and fittingly connected with the first transmission component; a third transmission component disposed on the input shaft; a fourth transmission component disposed on the output shaft and fittingly connected with the third transmission component; a changeover mechanism, which causes the first transmission component to rotate with rotation of the input shaft as the input shaft rotates, the first transmission component rotating to drive the second transmission component to rotate, the output shaft rotating with the rotation of the second transmission component; or which causes the third transmission component to rotate with rotation of the input shaft, the third transmission component rotating to drive the fourth transmission component to rotate, the output shaft rotating with the rotation of the fourth transmission component.

A control method for a power apparatus is also provided in the embodiments of the present disclosure, and the power apparatus includes: an input shaft; an output shaft; a connecting mechanism; a first driving mechanism of which an output end is connected with or separated from the input shaft through the connecting mechanism; a second driving mechanism of which an output end is fixedly connected with the input shaft; a first transmission component disposed on the input shaft; a second transmission component disposed on the output shaft and fittingly connected with the first transmission component; a third transmission component disposed on the input shaft; a fourth transmission component disposed on the output shaft and fittingly connected with the third transmission component; a changeover mechanism, which causes the first transmission component to rotate with rotation of the input shaft as the input shaft rotates, the first transmission component rotating to drive the second transmission component to rotate, the output shaft rotating with the rotation of the second transmission component; or which causes the third transmission component to rotate with rotation of the input shaft, the third transmission component rotating to drive the fourth transmission component to rotate, the output shaft rotating with the rotation of the fourth transmission component. The first driving mechanism is an engine, and the second driving mechanism is a first electric motor. The power apparatus further includes: a second electric motor and a battery, herein the second electric motor is connected with the crankshaft of the engine, the second electric motor is capable of providing a starting power for the engine, and the battery is connected with the first electric motor and the second electric motor respectively. The control method includes: when a navigation command is received, controlling the connecting mechanism to separate an output end of the engine from the input shaft, controlling the first electric motor to output a driving torque through the input shaft; controlling the engine to operate in such a way that the crankshaft of the engine rotates to drive the second electric motor to generate electricity by rotation, controlling the second electric motor to output the generated electricity to the first electric motor, and/or, controlling the second electric motor to output the generated electricity to the battery.

Description of the drawing reference signs: 101, first transmission component; 102, second transmission component; 103, third transmission component; 104, fourth transmission component; 105, fifth transmission component; 106, sixth transmission component; 107, first electromagnetic component; 108, second electromagnetic component; 110, input shaft; 120, output shaft; 130, connecting mechanism; 140, second driving mechanism; 150, first driving mechanism; 160, changeover mechanism; 170, driving shaft; 180, second electric motor; 191, front axle; 192, back axle; 193, front wheel; 194, rear wheel; 195, speed changer.

DETAILED DESCRIPTION

The disclosure is described in further detail with reference to the drawings and embodiments below. It should be understood that these embodiments hereinafter only contribute to a more thorough understanding of the disclosure, and should not be construed as a limit to the present disclosure.

In the description of the present disclosure, it should be noted that unless otherwise explicitly specified or defined, the term "connect/connection/connecting" should be understood in a broad sense. For example, the connection may be an electric connection, or an internal connection of two components; or it may be a direct connection, or an indirect connection through intermediate media. A person of ordinary skill in the art may understand the specific meanings of the foregoing terms in the present disclosure according to specific situations.

It is important to note that, in this disclosure, the terms "first/second/third" may only be used herein to distinguish one element from another element, without indicating any specific ordering for objects, and understandably, these terms "first/second/third" may be exchanged in a specific order or sequence where it is permitted, such that the embodiments of the present disclosure described herein may be implemented in other order besides those illustrated or described herein.

The present disclosure is further illustrated below in detail according to particular embodiments in combination with FIG. 1 to FIG. 4.

As shown in FIG. 1 to FIG. 4, the embodiments of the present disclosure describe a power apparatus, including: an input shaft 110;

an output shaft 120;

a connecting mechanism 130;

a first driving mechanism 150 of which an output end is connected with or separated from the input shaft 110 through the connecting mechanism 130;

a second driving mechanism 140 of which an output end is fixedly connected with the input shaft 110;

a first transmission component 101 disposed on the input shaft 110; a second transmission component 102 disposed on the output shaft 120 and fittingly connected with the first transmission component 101;

a third transmission component 103 disposed on the input shaft 110;

a fourth transmission component 104 disposed on the output shaft 120 and fittingly connected with the third transmission component 103;

a changeover mechanism 160, herein the changeover mechanism 160 causes the first transmission component 101 to rotate with rotation of the input shaft 110 as the input shaft 110 rotates, the first transmission component 101 rotating to drive the second transmission component 102 to rotate, the output shaft 120 rotating with the rotation of the second transmission component 102; or herein the changeover mechanism 160 causes the third transmission component 103 to rotate with rotation of the input shaft 110, the third transmission component 103 rotating to drive the fourth transmission component 104 to rotate, the output shaft 120 rotating with the rotation of the fourth transmission component 104.

In the embodiments of the present disclosure, the input shaft 110 is used to input the power of the first driving mechanism 150 and/or the second driving mechanism 140 into the power apparatus. The output shaft 120 is used to output the power of the first driving mechanism 150 and/or the second driving mechanism 140 from the power apparatus.

Here, the positions of the input shaft 110 and the output shaft 120 will not be limited. For example, the input shaft 110 may be parallel to the output shaft 120.

In the embodiments of the present disclosure, the structures of the first transmission component 101, the second transmission component 102, the third transmission component 103 and the fourth transmission component 104 will not be limited.

For example, the first transmission component 101 may be a first gear, and the second transmission component 102 may be a second gear, where the first gear meshes with the second gear; the third transmission component 103 may be a third gear, and the fourth transmission component 104 may be a fourth gear, where the third gear meshes with the fourth gear. Of course, the first transmission component 101, the second transmission component 102, the third transmission component 103 and the fourth transmission component 104 can also be other transmission structures.

Here, the transmission ratio of the meshing of the second gear and the first gear should be larger than the transmission ratio of the meshing of the fourth gear and the third gear, such that a low-speed transmission through the second gear and the first gear, as well as a high-speed transmission through the fourth gear and the third gear can be achieved. Of course, those skilled in the art can also set the transmission ratio of the meshing of the second gear and the first gear as well as the transmission ratio of the meshing of the fourth gear and the third gear as required.

In the embodiments of the present disclosure, the structure of the first driving mechanism 150 will not be limited, as long as it can provide power. For example, the first driving mechanism 150 may be an engine, or an electric motor.

In the embodiments of the present disclosure, the structure of the second driving mechanism 140 will not be limited, as long as it can provide power. For example, the second driving mechanism 140 may be an engine, or an electric motor.

In the embodiments of the present disclosure, the power apparatus may further include a controller, where the controller can control the connecting mechanism 130 to connect the output end of the first driving mechanism 150 with the input shaft 110, and control both the first driving mechanism 150 and the second driving mechanism 140 to output the driving torque through the input shaft 110, at the moment, the first driving mechanism 150 and the second driving mechanism 140 collectively provide power for the power apparatus, such that the starting acceleration time of the power apparatus can be shortened, thus the power apparatus can start quickly. Of course, the controller can also control the connecting mechanism 130 to connect the output end of the first driving mechanism 150 with the input shaft 110, control the first driving mechanism 150 to output the driving torque through the input shaft 110, and control the second driving mechanism 140 not to output the driving torque through the input shaft 110. Furthermore, the controller can control the connecting mechanism 130 to be separated from one of the output end of the first driving mechanism 150 and the input shaft 110, control the first driving mechanism 150 not to output the driving torque through the input shaft 110, and control the second driving mechanism 140 to output the driving torque through the input shaft 110.

As an example, the first driving mechanism 150 may be an engine, and the second driving mechanism 140 may be a first electric motor; here, the power apparatus may further include a controller, when a starting command is received, the controller can control the connecting mechanism 130 to separate the output end of the engine from the input shaft 110, control the first electric motor to output the driving torque through the input shaft 110, control the engine to operate, and when a rotation speed of the input shaft 110 is close to a rotation speed of the crankshaft of the engine, control the connecting mechanism 130 to connect the output end of the engine with the first end of the input shaft 110, at the moment, the engine and the first electric motor collectively provide power for the power apparatus, such that the starting acceleration time of the power apparatus can be shortened, thus the power apparatus can start quickly. Of course, the controller can also control one of the engine and the first electric motor to output the driving torque through the input shaft 110. Here, the starting command refers to the command that causes the power apparatus to start its running.

Here, when an acceleration command is received, the controller can also control the connecting mechanism 130 to connect the output end of the engine with the input shaft 110, control both the engine and the first electric motor to output the driving torque through the input shaft 110; such that the accelerating time of the power apparatus can be shortened, and the power apparatus can accelerate quickly. Of course, the controller can also control one of the engine and the first electric motor to output the driving torque through the input shaft 110. Here, the acceleration command refers to the command that causes the power apparatus to accelerate its running.

Here, when a reversing command is received, the controller can also control the connecting mechanism 130 to separate the output end of the engine from the input shaft 110; control the first electric motor to output the driving torque through the input shaft 110. It is to be understood by those skilled in the art that, the first electric motor reverses to realize the reverse traveling of the power apparatus at this moment. Here, the controller can control the engine to operate or stop operating. Here, the reversing command refers to the command that causes the power apparatus to travel reversely.

In some alternative implementations of the embodiments of the present disclosure, as shown in FIG. 1 to FIG. 4, the first driving mechanism 150 may be an engine, the second driving mechanism 140 may be a first electric motor, and the power apparatus may further include a second electric motor 180, herein an output end of the second electric motor 180 is connected with the crankshaft of the engine, and the second electric motor 180 is capable of providing a starting power for the engine. Here, through the second electric motor 180, the engine can be started and stopped quickly, thus it can be used more flexibly.

Here, the second electric motor may be directly coaxially connected with the crankshaft of the engine; and also be connected with the crankshaft of the engine by the meshing of a pair of gears.

Here, the second electric motor 180 may only be a electric motor; or it may be both a motor and a generator. For example, the second electric motor 180 can be an Integrated Starter and Generator (ISG) motor. When the second motor 180 is both a motor and a generator, the second motor 180 provides power to the engine as the engine starts, and when the engine operates normally, the engine can drive the second motor 180 to generate electricity.

In this implementation, the power apparatus may further include a controller and a battery; when a navigation command is received, the controller can control the connecting mechanism 130 to separate the output end of the engine from the input shaft 110; control the first electric motor to output the driving torque through the input shaft 110; control the engine to output the driving torque to an input end of the second electric motor 180, such that the second electric motor 180 can generate electricity; control the second electric motor 180 to output the generated electricity to the first electric motor; and/or, control the second electric motor 180 to output the generated electricity to the battery.

Here, the second electric motor 180 may output the generated electricity to the first electric motor; also, the second electric motor 180 may output the generated electricity to the battery; and the second electric motor 180 may also output part of the generated electricity to the first electric motor, and the remaining part to the battery.

Here, the battery may be connected with the first electric motor and the second electric motor respectively. The battery may provide electricity to the second electric motor 180, the first electric motor, and both the second electric motor 180 and the first electric motor.

Here, the navigation command refers to the command that causes the power apparatus to enter into a predetermined running status. For example, the navigation command may refer to the command that causes the power apparatus to enter into a running status with uniform velocity, or it may refer to the command that causes the power apparatus to enter into a running status with high efficiency. Herein, the running status with high efficiency means that the engine can sufficiently burn its fuels, and have high thermal efficiency. Here, by keeping the engine in the status with high thermal efficiency, the fuel consumption and the pollutant discharge can be reduced.

Here, when the electricity generated by the second electric motor 180 is less than the electricity used by the first electric motor, the controller can control the second electric motor 180 and the battery to collectively provide electricity to the first electric motor; when the electricity generated by the second electric motor 180 is larger than the electricity used by the first electric motor, the controller can control the second electric motor 180 to provide electricity for the first electric motor, and to output the electricity generated by the second electric motor 180 to the battery; when the electricity generated by the second electric motor 180 is equal to the electricity used by the first electric motor, the controller can control the second electric motor 180 to provide electricity to the first electric motor. Of course, the controller can also control the second electric motor 180 to directly output the generated electricity to the battery, where the battery will provide electricity to the first electric motor.

In this implementation, when a braking command is received, the controller may further be configured to control the connecting mechanism 130 to connect the output end of the engine with the input shaft 110, control the first electric motor to generate electricity and output the generated electricity to the battery, and control the second electric motor to generate electricity then output the generated electricity to the battery.

Here, the braking command refers to the command that causes the power apparatus to slow its running.

Here, the first electric motor and the second electric motor 180 can be both motor and generator. When the braking command is received, the controller can control the first electric motor and the second electric motor 180 to generate electricity, where the mechanical energy, during the braking process of the power apparatus, can be converted into the electric energy stored in the battery, thus the energy can be recovered, and the effect of energy-saving can be realized.

In the embodiments of this disclosure, the connecting mechanism 130 is used to realize the connection or separation of the first driving mechanism 150 and the input shaft 110. When the first driving mechanism 150 is connected with the input shaft 110, the first driving mechanism 150 will output the power through the input shaft 110, and when the first driving mechanism 150 is separated from the input shaft 110, the first driving mechanism 150 will not output the power through the input shaft 110.

Here, the structure and the position of the connecting mechanism 130 will not be limited, as long as it can connect the first driving mechanism 150 with the input shaft 110, or separate the first driving mechanism 150 from the input shaft 110. For example, the connecting mechanism 130 may be moved to realize the connection or separation of the first driving mechanism 150 and the input shaft 110. When the connecting mechanism 130 moves to a first limit position, the connecting mechanism 130 may connect the output end of the first driving mechanism 150 with a first end of the input shaft 110; when the connecting mechanism 130 moves to a second limit position, the connecting mechanism 130 may separate the output end of the first driving mechanism 150 from the first end of the input shaft 110. As an implementation, the connecting mechanism 130 can be a clutch.

In the embodiments of this disclosure, the changeover mechanism 160 is used to realize the power transmission of the power apparatus through a first path formed by the first transmission component 101 and the second transmission component 102; or to realize the power transmission of the power apparatus through a second path formed by the third transmission component 103 and the fourth transmission component 104.

Here, the structure and the position of the changeover mechanism 160 will not be limited, as long as it can cause the first transmission component 101 to rotate with rotation of the input shaft 110, the first transmission component 101 rotating to drive the second transmission component 102 to rotate, the output shaft 120 rotating with the rotation of the second transmission component 102; or the changeover mechanism 160 can cause the third transmission component 103 to rotate with rotation of the input shaft 110, the third transmission component 103 rotating to drive the fourth transmission component 104 to rotate, the output shaft 120 rotating with the rotation of the fourth transmission component 104.

In some alternative implementations of the embodiments of the present disclosure, the first transmission component 101 may be rotatably disposed relative to a circumferential direction of the input shaft 110 and fixedly disposed relative to an axial direction of the input shaft 110; and the second transmission component 102 may be fixed on the output shaft 120; the third transmission component 103 may be rotatably disposed relative to the circumferential direction of the input shaft 110 and fixedly disposed relative to the axial direction of the input shaft 110, and the fourth transmission component 104 may be fixed on the output shaft 120. When the input shaft 110 rotates, the changeover mechanism 160 can cause the first transmission component 101 to be fixedly disposed relative to the circumferential direction of the input shaft 110 and can cause the third transmission component 103 to be rotatably disposed relative to the circumferential direction of the input shaft 110; or the changeover mechanism 160 can cause the third transmission component 103 to be fixedly disposed relative to the circumferential direction of the input shaft 110 and can cause the first transmission component 101 to be rotatably disposed relative to the circumferential direction of the input shaft 110.

In this implementation, when the first transmission component 101 is rotatably disposed relative to a circumferential direction of the input shaft 110 and fixedly disposed relative to an axial direction of the input shaft 110, the first transmission component 101 can rotate but cannot move relative to the input shaft 110. When the changeover mechanism 160 causes the first transmission component 101 to be fixedly disposed relative to the circumferential direction of the input shaft 110, the first transmission component 101 can neither rotate nor move relative to the input shaft 110.

In this implementation, when the third transmission component 103 is rotatably disposed relative to a circumferential direction of the input shaft 110 and fixedly disposed relative to an axial direction of the input shaft 110, the third transmission component 103 can rotate but cannot move relative to the input shaft 110. When the changeover mechanism 160 causes the third transmission component 103 to be fixedly disposed relative to the circumferential direction of the input shaft 110, the third transmission component 103 can neither rotate nor move relative to the input shaft 110.

In this implementation, the structure of the changeover mechanism 160 will not be limited, as long as it can cause the first transmission component 101 to be fixedly disposed relative to the circumferential direction of the input shaft 110; or it can cause the third transmission component 103 to be fixedly disposed relative to the circumferential direction of the input shaft 110.

For example, the first transmission component 101 and the third transmission component 103 may be sleeved on the input shaft at intervals, and the changeover mechanism 160 may be disposed between the first transmission component 101 and the third transmission component 103; when the changeover mechanism 160 moves to the third limit position, the changeover mechanism 160 may be connected with the first transmission component 101 and with the input shaft 110 respectively, the first transmission component 101 may be fixedly disposed relative to the circumferential direction of the input shaft 110 through the changeover mechanism 160, and the third transmission component 103 may be rotatably disposed relative to the circumferential direction of the input shaft 110; when the changeover mechanism 160 moves to a fourth limit position, the changeover mechanism 160 may be connected with the third transmission component 103 and with the input shaft 110 respectively, and the third transmission component 103 may be fixedly disposed relative to the circumferential direction of the input shaft 110 through the changeover mechanism 160, the first transmission component 101 may be rotatably disposed relative to the circumferential direction of the input shaft 110.

In this example, the position of the changeover mechanism 160 will not be limited. Two positions of the changeover mechanism 160 are shown below.

In a first position of the changeover mechanism 160, the changeover mechanism 160 may include a sliding block disposed between the first transmission component 101 and the third transmission component 103, the input shaft 110 may be provided with a first sliding groove, the first transmission component 101 may be provided with a first clamping groove matched with the sliding block, and the third transmission component 103 may be provided with a second clamping groove matched with the sliding block; the first end of the sliding block may be inserted in the first sliding groove, and the second end of the sliding block may be inserted in the first clamping groove or the second clamping groove. When the changeover mechanism 160 moves to the third limit position, the second end of the sliding block may be inserted in the first clamping groove, the first transmission component 101 may be fixedly disposed relative to the circumferential direction of the input shaft 110 through the sliding block, and the second end of the sliding block may be located outside the second clamping groove, the third transmission component 103 may be rotatably disposed relative to the circumferential direction of the input shaft 110; when the changeover mechanism 160 moves to the fourth limit position, the second end of the sliding block may be inserted in the second clamping groove, the third transmission component 103 may be fixedly disposed relative to the circumferential direction of the input shaft 110 through the sliding block, and the second end of the sliding block may be located outside the first clamping groove, the first transmission component 101 may be rotatably disposed relative to the circumferential direction of the input shaft 110.

In a second position of the changeover mechanism 160, the changeover mechanism 160 may be sleeved on the input shaft 110, the changeover mechanism 160 may be fixedly disposed relative to the circumferential direction of the input shaft 110 and movably disposed relative to the axial direction of the input shaft 110; when the changeover mechanism 160 moves to the third limit position along the input shaft 110, the changeover mechanism 160 may be connected with the first transmission component 101; when the changeover mechanism 160 moves to the fourth limit position along the input shaft 110, the changeover mechanism 160 may be connected with the third transmission component 103.

In the second position of the changeover mechanism 160, the specific structure of the changeover mechanism 160 will not be limited. For example, the changeover mechanism 160 may be sleeved on a shifting wheel puller of the input shaft 110, the inter ring of the shifting wheel puller may be provided with a bulge, the input shaft 110 may be provided with a groove matching the bulge, and the bulge may be inserted in the groove, when the shifting wheel puller is inserted in the groove through the bulge and fixedly disposed relative to the circumferential direction of the input shaft 110, as well as the shifting wheel puller slides on the input shaft 110, the bulge may slide in the groove. Here, the outer ring of the shifting wheel puller may be provided with a first connecting gear, a second connecting gear matched with the first connecting gear may be arranged on the side of the first transmission component 101 which is adjacent to the third transmission component 103, and a third connecting gear matched with the first connecting gear may be arranged on the side of the third transmission component 103 which is adjacent to the first transmission component 101, when the shifting wheel puller moves to the third limit position along the input shaft 110, the first connecting gear may mesh with the second connecting gear, the shifting wheel puller may be connected with the first transmission component 101; when the shifting wheel puller moves to the fourth limit position along the input shaft 110, the first connecting gear may mesh with the third connecting gear, the shifting wheel puller may be connected with the third transmission component 103;

In the second position of the changeover mechanism 160, the power mechanism controlling the movement of the changeover mechanism 160 will not be limited. For example, the power apparatus may further include a first electromagnetic component 107 disposed on the first transmission component 101; a second electromagnetic component 108 disposed on the third transmission component 103; when the first electromagnetic component 107 is energized and the second electromagnetic component 108 is de-energized, the changeover mechanism 160 may move to the third limit position by a magnetic force of the first electromagnetic component 107, and the changeover mechanism 160 may be connected with the first transmission component 101; when the first electromagnetic component 107 is de-energized and the second electromagnetic component 108 is energized, the changeover mechanism may move to the fourth limit position by a magnetic force of the second electromagnetic component 108, and the changeover mechanism 160 may be connected with the third transmission component 103.

Here, the changeover mechanism 160 may include an iron or magnetic component attractive to the first electromagnetic component 107, and also an iron or magnetic component attractive to the second electromagnetic component 108.

Figure 1:
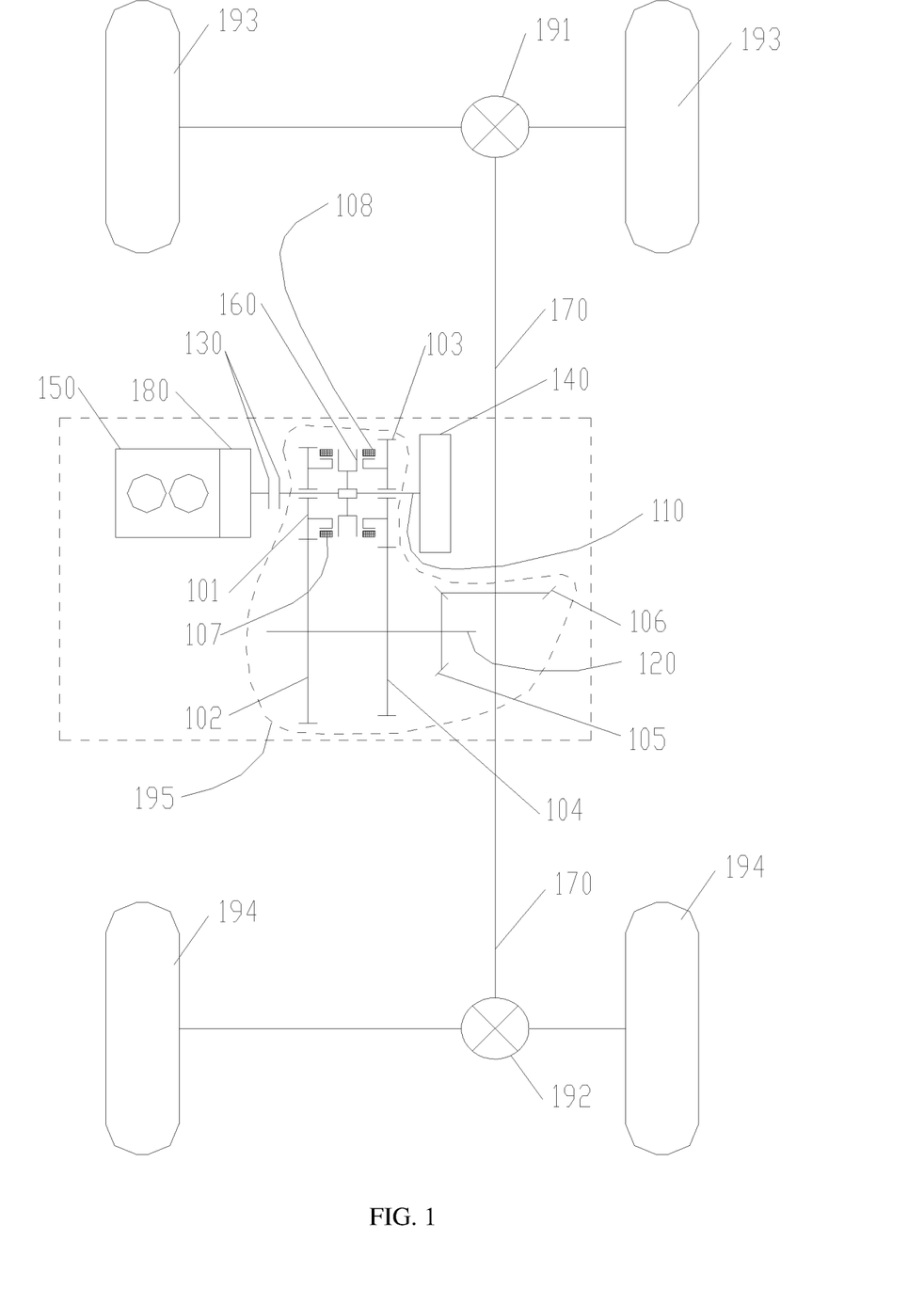
FIG. 1 is an alternative schematic structural diagram of a power apparatus according to an embodiment of the present disclosure.
Figure 2:
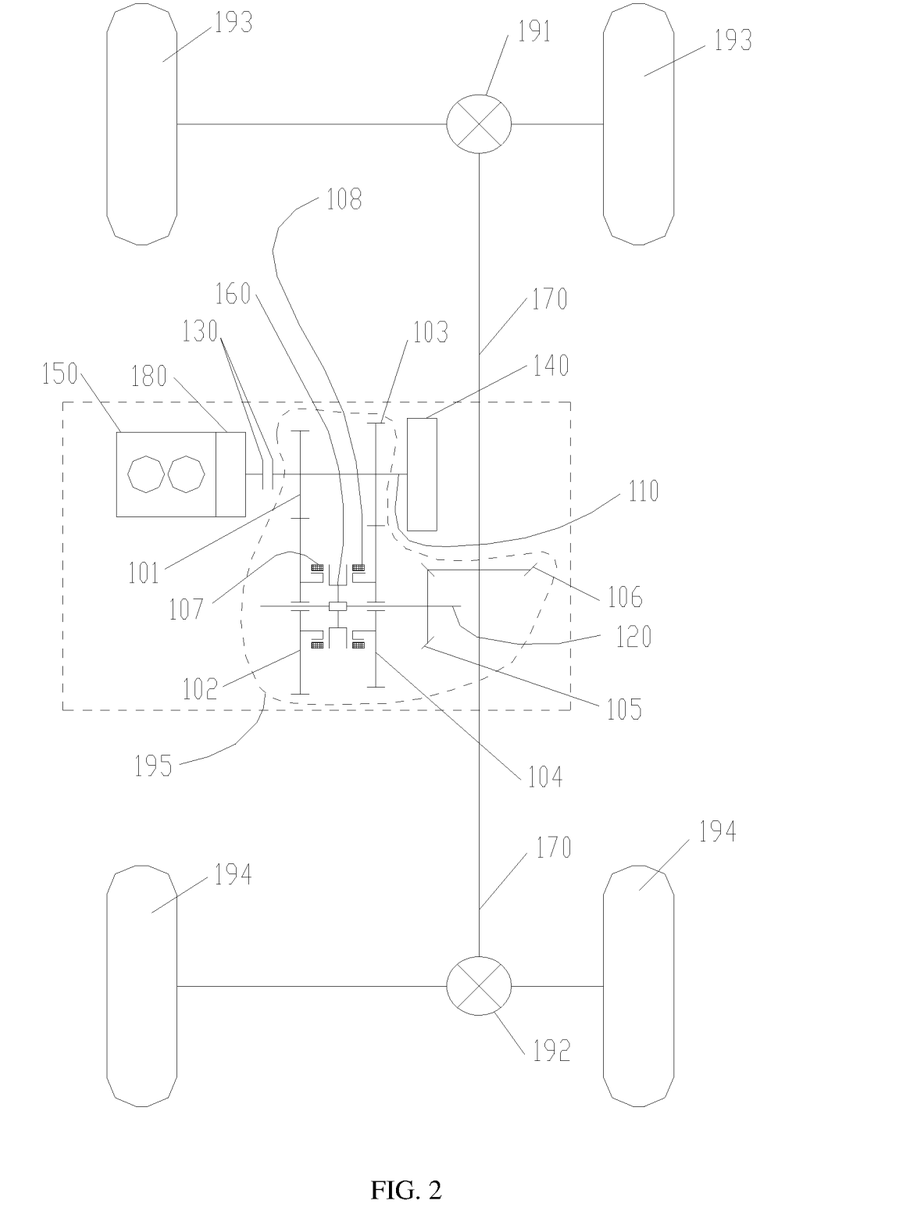
FIG. 2 is an alternative schematic structural diagram of a power apparatus according to an embodiment of the present disclosure.
Figure 3:
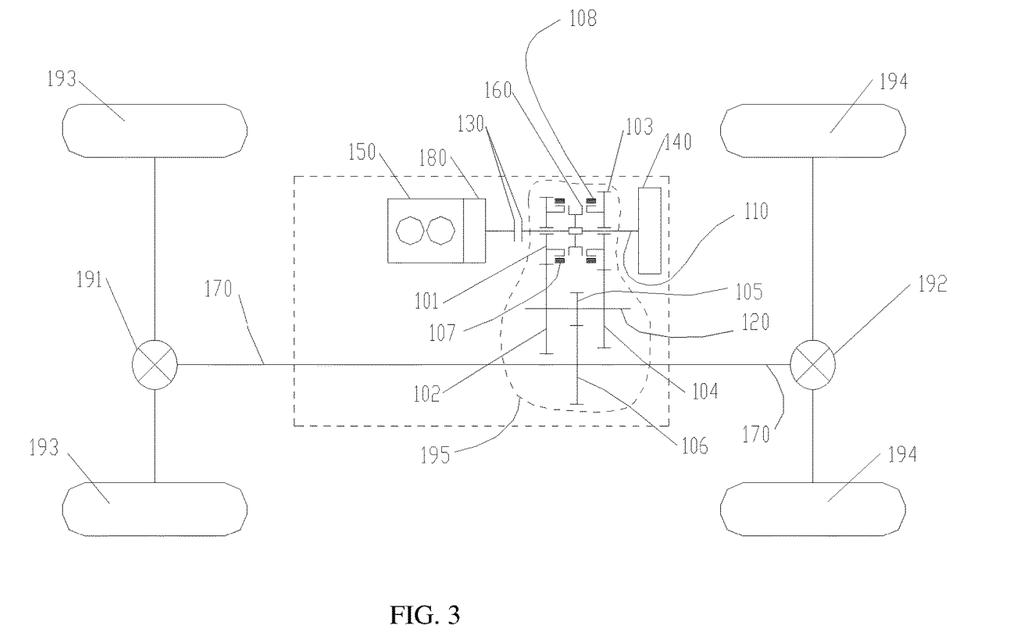
FIG. 3 is an alternative schematic structural diagram of a power apparatus according to an embodiment of the present disclosure.

Here, the positions of the first electromagnetic component 107 and the second electromagnetic component 108 will not be limited. For example, as shown in FIG. 1 to FIG. 3, the first electromagnetic component 107 may be disposed on the side of the first transmission component 101 which is adjacent to the third transmission component 103, and the second electromagnetic component 108 may be disposed on the side of the third transmission component 103 which is adjacent to the first transmission component 101.

Here, the shapes of the first electromagnetic component 107 and the second electromagnetic component 108 will not be limited. For example, as shown in FIG. 1 to FIG. 3, the first electromagnetic component 107 may be annularly disposed on the side of the first transmission component 101 which is adjacent to the third transmission component 103, the second electromagnetic component 108 may be annularly disposed on the side of the third transmission component 103 which is adjacent to the first transmission component 101. Here, the first electromagnetic component 107 and the second electromagnetic component 108 may be fixed on the housing of the gearbox or the engine's crankcase.

Here, the changeover mechanism 160 may further include a reset component, connected with the changeover mechanism 160 and the input shaft 110 respectively; when the first electromagnetic component 107 is energized and the second electromagnetic component 108 is de-energized, the changeover mechanism 160 may overcome a deformation force of the reset component and moves to the third limit position by the magnetic force of the first electromagnetic component 107, and the changeover mechanism 160 may be connected with the first transmission component 101; when the first electromagnetic component 107 is de-energized and the second electromagnetic component 108 is de-energized, the changeover mechanism 160 may move to a fifth position by a restoring force of the reset component, and the changeover mechanism 160 may be separated from the first transmission component 101; when the first electromagnetic component 107 is de-energized and the second electromagnetic component 108 is energized, the changeover mechanism 160 may overcome the deformation force of the reset component and move to the fourth limit position by the magnetic force of the second electromagnetic component 108, and the changeover mechanism 160 may be connected with the third transmission component 103; when the first electromagnetic component 107 is de-energized and the second electromagnetic component 108 is de-energized, the changeover mechanism 160 may move to the fifth position by the restoring force of the reset component, and the changeover mechanism 160 may be separated from the third transmission component 103.

Here, when the first electromagnetic component 107 is de-energized and the second electromagnetic component 108 is de-energized, the changeover mechanism 160 can be kept in the fifth position by the reset component, in this moment, the changeover mechanism 160 may be separated from the first transmission component 101 and the third transmission component 103 respectively, and the power apparatus will not output any power.

Here, the structure of the reset component will not be limited. For example, the reset component may be a spring.

In some alternative implementations of the embodiments of the present disclosure, the second transmission component 102 may be rotatably disposed relative to a circumferential direction relative to the output shaft 120 and fixedly disposed relative to an axial direction of the output shaft 120, and the first transmission component 101 may be fixed on the input shaft 110; the fourth transmission component 104 may be rotatably disposed relative to the circumferential direction relative to the output shaft 120 and fixedly disposed relative to the axial direction of the output shaft 120, and the third transmission component 103 may be fixed on the input shaft 110; when the input shaft 110 rotates, the changeover mechanism 160 may cause the second transmission component 102 to be fixedly disposed relative to the circumferential direction of the output shaft 120, and cause the fourth transmission component 104 to be rotatably disposed relative to the circumferential direction of the output shaft 120; or the changeover mechanism 160 may cause the fourth transmission component 104 to be fixedly disposed relative to the circumferential direction of the output shaft 120, and cause the second transmission component 102 to be rotatably disposed relative to the circumferential direction of the output shaft 120.

In this implementation, the second transmission component 102 may be rotatably disposed relative to the circumferential direction relative to the output shaft 120 and fixedly disposed relative to the axial direction of the output shaft 120; the second transmission component 102 can rotate but cannot move relative to the output shaft 120. When the changeover mechanism 160 causes the second transmission component 102 to be fixedly disposed relative to the circumferential direction of the output shaft 120, the second transmission component 102 can neither rotate nor move relative to the output shaft 120.

In this implementation, when the fourth transmission component 104 is rotatably disposed relative to the circumferential direction relative to the output shaft 120 and fixedly disposed relative to the axial direction of the output shaft 120, the fourth transmission component 104 can rotate but cannot move relative to the output shaft 120. When the changeover mechanism 160 causes the fourth transmission component 104 to be fixedly disposed relative to the circumferential direction of the output shaft 120, the fourth transmission component 104 can neither rotate nor move relative to the output shaft 120.

Figure 4:
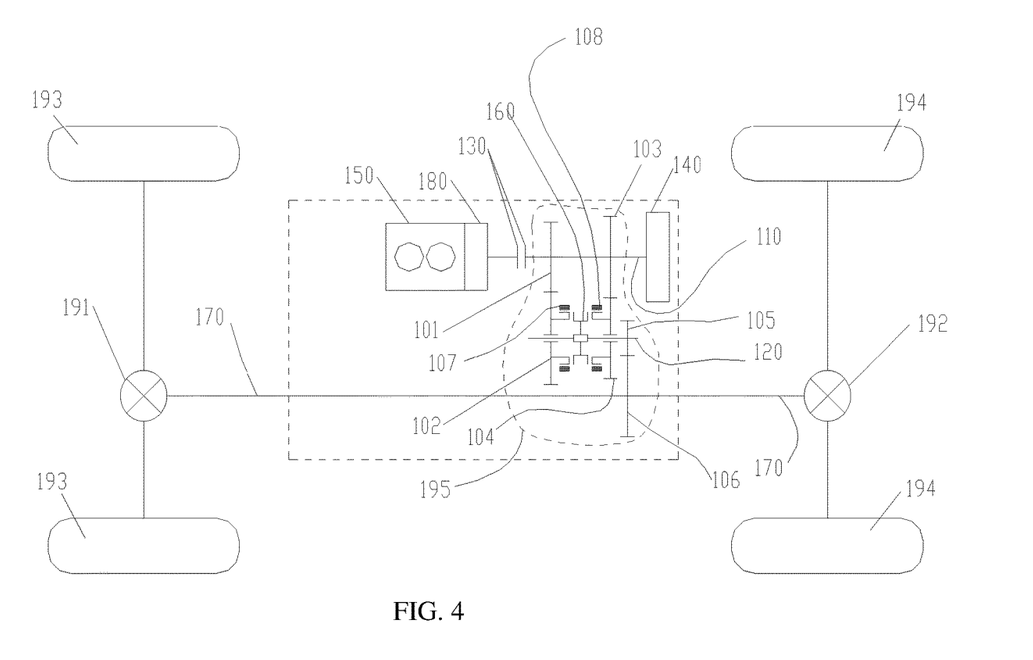
FIG. 4 is an alternative schematic diagram of the traveling status of a power apparatus according to an embodiment of the present disclosure.

In this implementation, as shown in FIG. 2 to FIG. 4, the second transmission component 102 and the fourth transmission component 104 may be sleeved on the output shaft 120 at intervals, and the changeover mechanism 160 may be disposed between the second transmission component 102 and the fourth transmission component 104; when the changeover mechanism 160 moves to the fifth limit position, the changeover mechanism 160 may be connected with the second transmission component 102 and with the output shaft 120 respectively, the second transmission component 102 may be fixedly disposed relative to the circumferential direction of the output shaft 120 through the changeover mechanism 160, and the fourth transmission component 104 may be rotatably disposed relative to the circumferential direction of the output shaft 120; when the changeover mechanism 160 moves to the fourth limit position, the changeover mechanism 160 may be connected with the fourth transmission component 104 and with the output shaft 120 respectively, and the fourth transmission component 104 may be fixedly disposed relative to the circumferential direction of the output shaft 120 through the changeover mechanism 160, and the second transmission component 102 may be rotatably disposed relative to the circumferential direction of the output shaft 120.

In this implementation, the changeover mechanism 160 has been described above and will not be described here.

In this implementation, the power apparatus may further include: a first electromagnetic component 107 disposed on the second transmission component 102; a second electromagnetic component 108 disposed on the fourth transmission component 104; when the first electromagnetic component 107 is energized and the second electromagnetic component 108 is de-energized, the changeover mechanism 160 may move to the third limit position by a magnetic force of the first electromagnetic component 107, and the changeover mechanism 160 may be connected with the second transmission component 102; when the first electromagnetic component 107 is de-energized and the second electromagnetic component 108 is energized, the changeover mechanism may move to the fourth limit position by a magnetic force of the second electromagnetic component 108, and the changeover mechanism 160 may be connected with the fourth transmission component 104.

Here, the first electromagnetic component 107 and the second electromagnetic component 108 have been described above and will not be described here.

Here, the changeover mechanism 160 has been described above and will not be described here.

In some alternative implementations of the embodiments of the present disclosure, as shown in FIG. 1 to FIG. 4, the power apparatus may further include: a fifth transmission component fixedly disposed on the output shaft 120; a driving shaft 170; a sixth transmission component 106 fixedly disposed on the driving shaft 170 and fittingly connected with the fifth transmission component 105.

In this implementation, the fifth transmission component 105 may be fittingly connected with the sixth transmission component 106, such that the power of the power apparatus can be output through the driving shaft 170.

Here, as shown in FIG. 1 to FIG. 4, the driving shaft 170 may be a front driving shaft and a back driving shaft of the traveling device. Here, the first end of the driving shaft 170 may be connected with the traveling device's front axle 191, and the second end of the driving shaft 170 may be connected with the traveling device's back axle 192. Here, the front axle 191 may be connected with a front wheel 193, the back axle 192 may be connected with a rear wheel 194.

Here, the structures of the fifth transmission component 105 and the sixth transmission component 106 will not be limited. When the first transmission component 101 is a first gear, and the second transmission component 102 is a second gear, the first gear may mesh with the second gear; and when the third transmission component 103 is a third gear, the fourth transmission component 104 is a fourth gear; the third gear may mesh with the fourth gear; and when the fifth transmission component 105 is a fifth gear, and the sixth transmission component 106 is a sixth gear, the fifth gear may mesh with the sixth gear.

Here, the position of the driving shaft 170 will not be limited. For example, the driving shaft 170 may be parallel or perpendicular to the output shaft 120. When the driving shaft 170, the output shaft 120 and the input shaft 110 are parallel, the power apparatus refers to be longitudinally disposed. Here, as shown in FIG. 3 and FIG. 4, the fifth transmission component 105 may be disposed between the second transmission component 102 and the fourth transmission component 104; it may also be disposed on the side of the fourth transmission component 104 which is far away from the second transmission component 102. When the driving shaft 170 is perpendicular to the output shaft 120, and the output shaft 120 are parallel to the input shaft 110, the power apparatus refers to be horizontally disposed. Here, as shown in FIG. 1 and FIG. 2, the fifth transmission component 105 may be disposed on the side of the fourth transmission component 104 which is far away from the second transmission component 102.

It is to be understood by those skilled in the art that, as shown in FIG. 1 to FIG. 4, all of the first transmission component 101, the second transmission component 102, the third transmission component 103, the fourth transmission component 104, the fifth transmission component 105, the sixth transmission component 106, the input shaft 110 and the output shaft 120 contribute to form a speed changer 195 of the power apparatus.

In the embodiments of this disclosure, the power apparatus may include a first driving mechanism 150 and a second driving mechanism 140, herein an output end of the second driving mechanism 140 may be fixedly connected with the input shaft 110, such that it can provide power for the power apparatus; when an output end of the first driving mechanism 150 is connected with the input shaft 110 through the connecting mechanism, it can also provide power for the power apparatus; when one of the first driving mechanism 150 and the second driving mechanism 140 breaks down, the other one will provide power for the traveling device which can improve the safety of the power apparatus.

The embodiments of this disclosure also provide a traveling device. The traveling device includes a power apparatus, which is the power apparatus described in above embodiments.

The traveling device herein can be an all-terrain vehicle.

The embodiments of this disclosure also describe a control method for a power apparatus, which includes the power apparatus described in above embodiments; herein, the first driving mechanism may be an engine, and the second driving mechanism may be a first electric motor; the power apparatus may further include a second electric motor and a battery; the second electric motor may be connected with the crankshaft of the engine, the second electric motor is capable of providing a starting power for the engine, and the battery may be connected with the first electric motor and the second electric motor respectively;

the control method includes:

when a navigation command is received, controlling the connecting mechanism to separate an output end of the engine from the input shaft, controlling the first electric motor to output a driving torque through the input shaft; controlling the engine to operate in such a way that the crankshaft of the engine rotates to drive the second electric motor to generate electricity by rotation, controlling the second electric motor to output the generated electricity to the first electric motor, and/or, controlling the second electric motor to output the generated electricity to the battery.

In the embodiments of this disclosure, the engine, the first electric motor and the second electric motor have been described in above embodiments for the power apparatus, and will not be described here.

In the embodiments of this disclosure, the second electric motor may output the generated electricity to the first electric motor; the second electric motor may output the generated electricity to the battery; and the second electric motor may also output part of the generated electricity to the first electric motor, and the remaining part to the battery.

Here, the battery may be connected with the first electric motor and the second electric motor respectively; the battery may provide electricity to the second electric motor, the first electric motor, and both the second electric motor and the first electric motor.

In the embodiments of this disclosure, the navigation command refers to the command that causes the power apparatus to enter into a predetermined running status. For example, the navigation command may refer to the command that causes the power apparatus to enter into a running status with uniform velocity, or it may refer to the command that causes the power apparatus to enter into a running status with high efficiency. Herein, the running status with high efficiency means that the engine can sufficiently burn its fuels, and have high thermal efficiency. Here, by keeping the engine in the status with high thermal efficiency, the fuel consumption and the pollutant discharge can be reduced.

Here, when the electricity generated by the second electric motor is less than the electricity used by the first electric motor, the controller can control the second electric motor and the battery to collectively provide electricity to the first electric motor; when the electricity generated by the second electric motor is larger than the electricity used by the first electric motor, the controller can control the second electric motor to provide electricity to the first electric motor and to output the electricity generated by the second electric motor to the battery; when the electricity generated by the second electric motor is equal to the electricity used by the first electric motor, the controller can control the second electric motor to provide electricity to the first electric motor. Of course, the controller can also control the second electric motor to directly output the generated electricity to the battery, where the battery will provide electricity for the first electric motor.

In some alternative implementations of the embodiments of the present disclosure, the control method may further include:

when a starting command is received, controlling the connecting mechanism to separate the output end of the engine from the input shaft; controlling the first electric motor to output the driving torque through the input shaft; controlling the engine to operate, and when a rotation speed of the output end of the engine is close to a rotation speed of the input shaft, controlling the connecting mechanism to connect the output end of the engine with the input shaft, and controlling both the engine and the first electric motor to output the driving torque through the input shaft.

Here, the starting command refers to the command that causes the power apparatus to start its running.

Here, when the engine and the first electric motor collectively provide power for the power apparatus, the starting acceleration time of the power apparatus can be shortened, thus the power apparatus can start quickly.

In some alternative implementations of the embodiments of the present disclosure, the control method may further include:

when an acceleration command is received, controlling the connecting mechanism to connect the output end of the engine with the input shaft; controlling the first electric motor to output the driving torque through the input shaft; controlling the engine to operate, and when a rotation speed of the output end of the engine is close to a rotation speed of the input shaft, controlling the connecting mechanism to connect the output end of the engine with the input shaft, and controlling both the engine and the first electric motor to output the driving torque through the input shaft.

Here, the acceleration command refers to the command that causes the power apparatus to accelerate its operation.

when the engine and the first electric motor collectively provide power for the power apparatus, the accelerating time of the power apparatus can be shortened, and the power apparatus can accelerate quickly.

In some alternative implementations of the embodiments of the present disclosure, the control method may further include:

when a braking command is received, controlling the connecting mechanism to connect the output end of the engine with the input shaft, controlling the first electric motor to generate electricity and output the generated electricity to the battery, controlling the second electric motor to generate electricity then output the generated electricity to the battery.

Here, the braking command refers to the command that causes the power apparatus to slow its running.

Here, the first electric motor and the second electric motor can be both motors and generators. When the braking command is received, the controller can control the first electric motor and the second electric motor 180 to generate electricity, where the mechanical energy, during the braking process of the power apparatus, can be converted into the electric energy stored in the battery, thus the energy can be recovered, and the effect of energy-saving can be realized.

In some alternative implementations of the embodiments of the present disclosure, the control method may further include:

when a reversing command is received, controlling the connecting mechanism to separate the output end of the engine from the input shaft, and controlling the first electric motor to output a driving torque through the input shaft.

Here, the reversing command refers to the command that causes the power apparatus to travel reversely.

It is to be understood by those skilled in the art that, the first electric motor reverses to realize the reverse traveling of the power apparatus at this moment. Here, the controller can control the engine to operate or stop operating.

The contents above will be only the specific implementations of the disclosure; it should not be as a limitation to the scope of the disclosure. Obviously, those skilled in the art can make various modifications and variations to the disclosure without departing from the scope of the disclosure. Thus, if these modifications and variations of the disclosure fall within the scope of the claims of the disclosure and equivalent technologies thereof, the disclosure is also intended to include these modifications and variations.

The invention claimed is:

1. A power apparatus, comprising:
an input shaft;
an output shaft;
a connecting mechanism;
a first driving mechanism of which an output end is connected with or separated from the input shaft through the connecting mechanism;
a second driving mechanism of which an output end is fixedly connected with the input shaft;
a first transmission component disposed on the input shaft;
a second transmission component disposed on the output shaft and fittingly connected with the first transmission component;
a third transmission component disposed on the input shaft;
a fourth transmission component disposed on the output shaft and fittingly connected with the third transmission component; and
a changeover mechanism, wherein the changeover mechanism causes the first transmission component to rotate with rotation of the input shaft as the input shaft rotates, the first transmission component rotating to drive the second transmission component to rotate, the output shaft rotating with the rotation of the second transmission component; or wherein the changeover mechanism causes the third transmission component to rotate with rotation of the input shaft, the third transmission component rotating to drive the fourth transmission component to rotate, the output shaft rotating with the rotation of the fourth transmission component.

2. The power apparatus according to claim 1, wherein:
when the connecting mechanism moves to a first limit position, the connecting mechanism connects the output end of the first driving mechanism with a first end of the input shaft;
when the connecting mechanism moves to a second limit position, the connecting mechanism separates the output end of the first driving mechanism from the first end of the input shaft.

3. The power apparatus according to claim 1, wherein:
the first transmission component is rotatably disposed relative to a circumferential direction of the input shaft and fixedly disposed relative to an axial direction of the input shaft, and the second transmission component is fixed on the output shaft;
the third transmission component is rotatably disposed relative to the circumferential direction of the input shaft and fixedly disposed relative to the axial direction of the input shaft, and the fourth transmission component is fixed on the output shaft;
when the input shaft rotates, the changeover mechanism causes the first transmission component to be fixedly disposed relative to the circumferential direction of the input shaft and causes the third transmission component to be rotatably disposed relative to the circumferential direction of the input shaft, or the changeover mechanism causes the third transmission component to be fixedly disposed relative to the circumferential direction of the input shaft and causes the first transmission component to be rotatably disposed relative to the circumferential direction of the input shaft.

4. The power apparatus according to claim 3, wherein the first transmission component and the third transmission component are sleeved on the input shaft at intervals, and the changeover mechanism is disposed between the first transmission component and the third transmission component;
when the changeover mechanism moves to a third limit position, the changeover mechanism is connected with the first transmission component and with the input shaft respectively, the first transmission component is fixedly disposed relative to the circumferential direction of the input shaft through the changeover mechanism, and the third transmission component is rotatably disposed relative to the circumferential direction of the input shaft;
when the changeover mechanism moves to a fourth limit position, the changeover mechanism is connected with the third transmission component and with the input shaft respectively, the third transmission component is fixedly disposed relative to the circumferential direction of the input shaft through the changeover mechanism, and the first transmission component is rotatably disposed relative to the circumferential direction of the input shaft.

5. The power apparatus according to claim 4, wherein the changeover mechanism is sleeved on the input shaft, the changeover mechanism is fixedly disposed relative to the circumferential direction of the input shaft and movably disposed relative to the axial direction of the input shaft;
when the changeover mechanism moves to the third limit position along the input shaft, the changeover mechanism is connected with the first transmission component; when the changeover mechanism moves to the fourth limit position along the input shaft, the changeover mechanism is connected with the third transmission component.

6. The power apparatus according to claim 4, comprising:
a first electromagnetic component disposed on the first transmission component; and
a second electromagnetic component disposed on the third transmission component;
when the first electromagnetic component is energized and the second electromagnetic component is de-energized, the changeover mechanism moves to the third limit position by a magnetic force of the first electromagnetic component, and the changeover mechanism is connected with the first transmission component;
when the first electromagnetic component is de-energized and the second electromagnetic component is energized, the changeover mechanism moves to the fourth limit position by a magnetic force of the second electromagnetic component, and the changeover mechanism is connected with the third transmission component.

7. The power apparatus according to claim 6, wherein the changeover mechanism further comprises:
a reset component, connected with the changeover mechanism and the input shaft respectively;
when the first electromagnetic component is energized and the second electromagnetic component is de-energized, the changeover mechanism overcomes a deformation force of the reset component and moves to the third limit position by the magnetic force of the first electromagnetic component, and the changeover mechanism is connected with the first transmission component; when the first electromagnetic component is de-energized and the second electromagnetic component is de-energized, the changeover mechanism moves to a fifth position by a restoring force of the reset component, and the changeover mechanism is separated from the first transmission component;
when the first electromagnetic component is de-energized and the second electromagnetic component is energized, the changeover mechanism overcomes the deformation force of the reset component and moves to the fourth limit position by the magnetic force of the second electromagnetic component, and the changeover mechanism is connected with the third transmission component; when the first electromagnetic component is de-energized and the second electromagnetic component is de-energized, the changeover mechanism moves to the fifth position by the restoring force of the reset component, and the changeover mechanism is separated from the third transmission component.

8. The power apparatus according to claim 1, wherein:
the second transmission component is rotatably disposed relative to a circumferential direction of the output shaft and fixedly disposed relative to an axial direction of the output shaft, and the first transmission component is fixed on the input shaft;
the fourth transmission component is rotatably disposed relative to the circumferential direction of the output shaft and fixedly disposed relative to the axial direction of the output shaft, and the third transmission component is fixed on the input shaft;
when the input shaft rotates, the changeover mechanism causes the second transmission component to be fixedly disposed relative to the circumferential direction of the output shaft and causes the fourth transmission component to be rotatably disposed relative to the circumferential direction of the output shaft, or the changeover mechanism causes the fourth transmission component to be fixedly disposed relative to the circumferential direction of the output shaft and causes the second transmission component to be rotatably disposed relative to the circumferential direction of the output shaft.

9. The power apparatus according to claim 1, further comprising:
a fifth transmission component fixedly disposed on the output shaft;
a driving shaft; and
a sixth transmission component fixedly disposed on the driving shaft and fittingly connected with the fifth transmission component.

10. The power apparatus according to claim 1, wherein the first driving mechanism is an engine, and the second driving mechanism is a first electric motor.

11. The power apparatus according to claim 10, further comprising: a second electric motor, wherein the second electric motor is connected with a crankshaft of the engine, and the second electric motor is capable of providing a starting power for the engine.

12. A traveling device, comprising a power apparatus that comprises:
an input shaft;
an output shaft;
a connecting mechanism;

a first driving mechanism of which an output end is connected with or separated from the input shaft through the connecting mechanism;

a second driving mechanism of which an output end is fixedly connected with the input shaft;

a first transmission component disposed on the input shaft;

a second transmission component disposed on the output shaft and fittingly connected with the first transmission component;

a third transmission component disposed on the input shaft;

a fourth transmission component disposed on the output shaft and fittingly connected with the third transmission component; and a changeover mechanism, wherein the changeover mechanism causes the first transmission component to rotate with rotation of the input shaft as the input shaft rotates, the first transmission component rotating to drive the second transmission component to rotate, the output shaft rotating with the rotation of the second transmission component; or wherein the changeover mechanism causes the third transmission component to rotate with rotation of the input shaft, the third transmission component rotating to drive the fourth transmission component to rotate, the output shaft rotating with the rotation of the fourth transmission component;

wherein the power apparatus further comprises a driving shaft, wherein the driving shaft is a front driving shaft or a back driving shaft of the traveling device, a first end of the driving shaft is connected with a front axle of the traveling device, and a second end of the driving shaft is connected with a back axle of the traveling device.

13. The traveling device according to claim 12, wherein:
when the connecting mechanism moves to a first limit position, the connecting mechanism connects the output end of the first driving mechanism with a first end of the input shaft;
when the connecting mechanism moves to a second limit position, the connecting mechanism separates the output end of the first driving mechanism from the first end of the input shaft.

14. The traveling device according to claim 12, wherein:
the first transmission component is rotatably disposed relative to a circumferential direction of the input shaft and fixedly disposed relative to an axial direction of the input shaft, and the second transmission component is fixed on the output shaft;
the third transmission component is rotatably disposed relative to the circumferential direction of the input shaft and fixedly disposed relative to the axial direction of the input shaft, and the fourth transmission component is fixed on the output shaft;
when the input shaft rotates, the changeover mechanism causes the first transmission component to be fixedly disposed relative to the circumferential direction of the input shaft and causes the third transmission component to be rotatably disposed relative to the circumferential direction of the input shaft, or the changeover mechanism causes the third transmission component to be fixedly disposed relative to the circumferential direction of the input shaft and causes the first transmission component to be rotatably disposed relative to the circumferential direction of the input shaft.

15. The traveling device according to claim 14, wherein the first transmission component and the third transmission component are sleeved on the input shaft at intervals, and the changeover mechanism is disposed between the first transmission component and the third transmission component;
when the changeover mechanism moves to a third limit position, the changeover mechanism is connected with the first transmission component and with the input shaft respectively, the first transmission component is fixedly disposed relative to the circumferential direction of the input shaft through the changeover mechanism, and the third transmission component is rotatably disposed relative to the circumferential direction of the input shaft;
when the changeover mechanism moves to a fourth limit position, the changeover mechanism is connected with the third transmission component and with the input shaft respectively, the third transmission component is fixedly disposed relative to the circumferential direction of the input shaft through the changeover mechanism, and the first transmission component is rotatably disposed relative to the circumferential direction of the input shaft.

16. The traveling device according to claim 15, wherein the changeover mechanism is sleeved on the input shaft, the changeover mechanism is fixedly disposed relative to the circumferential direction of the input shaft and movably disposed relative to the axial direction of the input shaft;
when the changeover mechanism moves to the third limit position along the input shaft, the changeover mechanism is connected with the first transmission component; when the changeover mechanism moves to the fourth limit position along the input shaft, the changeover mechanism is connected with the third transmission component.

17. A control method for a power apparatus, comprising:
when a navigation command is received,
controlling a connecting mechanism of the power apparatus to separate an output end of an engine that is a first driving mechanism of the power apparatus from an input shaft of the power apparatus;
controlling a first electric motor that is a second driving mechanism of the power apparatus to output a driving torque through the input shaft;
controlling the engine to operate in such a way that a crankshaft of the engine rotates to drive a second electric motor of the power apparatus to generate electricity by rotation; and
at least one of controlling the second electric motor to output the generated electricity to the first electric motor or controlling the second electric motor to output the generated electricity to a battery of the power apparatus,
wherein the second electric motor is connected with the crankshaft of the engine, the second electric motor is capable of providing a starting power for the engine, and the battery is connected with the first electric motor and the second electric motor respectively.

18. The control method according to claim 17, further comprising:
when a starting command is received,
controlling the connecting mechanism to separate the output end of the engine from the input shaft;
controlling the first electric motor to output the driving torque through the input shaft;
controlling the engine to operate; and
when a rotation speed of the output end of the engine is close to a rotation speed of the input shaft, controlling the connecting mechanism to connect the output end of the engine with the input shaft, and controlling both the engine and the first electric motor to output the driving torque through the input shaft.

19. The control method according to claim 17, further comprising:
when a braking command is received,
controlling the connecting mechanism to connect the output end of the engine with the input shaft;
controlling the first electric motor to generate electricity and output the generated electricity to the battery; and
controlling the second electric motor to generate electricity and output the generated electricity to the battery.

20. The control method according to claim 17, further comprising:
when a reversing command is received,
controlling the connecting mechanism to separate the output end of the engine from the input shaft; and
controlling the first electric motor to output a driving torque through the input shaft.

* * * * *